United States
Cox

[54] SYMMETRICAL OPTICAL LENS SYSTEM

[75] Inventor: Arthur Cox, Park Ridge, Ill.

[73] Assignee: The Austin Company, Cleveland, Ohio

[22] Filed: May 17, 1971

[21] Appl. No.: 143,954

[52] U.S. Cl..................................350/214, 350/177
[51] Int. Cl................................................G02b 9/64
[58] Field of Search.......................350/214, 216, 177

[56] References Cited

UNITED STATES PATENTS 3,540,800  11/1970  Tibbetts et al.........................350/214
2,481,639  9/1949  Altman et al.........................350/214 X
3,133,983  5/1964  Rickless et al.........................350/216

FOREIGN PATENTS OR APPLICATIONS 954,808  4/1964  Great Britain.......................350/216

Primary Examiner—John K. Corbin
Attorney—Woodling, Krost, Granger & Rust

[57] ABSTRACT

An optical lens system is disclosed comprising nine elements having a reduced Petzval sum, a wide field and low secondary spectrum Spherical aberrations, coma, astigmatism and distortion are similarly reduced resulting in a diffraction limited superachromat.

19 Claims, 1 Drawing Figure

PATENTED MAY 15 1973
3,733,115
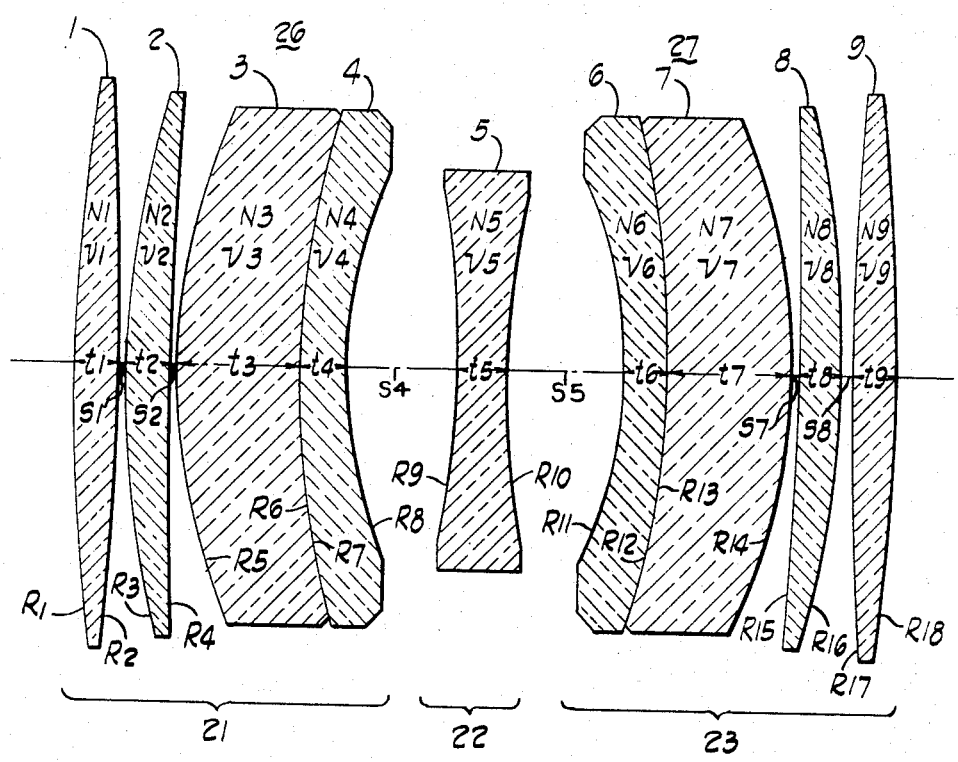
INVENTOR.
ARTHUR COX
BY Woodling, Krost,
Granger and Rust
ATTORNEYS

SYMMETRICAL OPTICAL LENS SYSTEM

BACKGROUND OF THE INVENTION

The advent of the use of the computer into the field of optics has made it possible to produce a remarkable advance in the design of lens systems in the last decade. Consequently, lens systems have become more sophisticated and more refined. However, most of these prior art lens systems have been designed to correct for third or fifth order Seidel aberrations and chromatic aberrations. These systems advanced the art but made little or no attempt to reduce secondary spectrum. The prior art lens systems that attempted to reduce secondary spectrum, accomplished this generally at the expense of the field coverage of the lens. The prior art lens systems known to me and claiming to have a reduced secondary spectrum were limited to a narrow field coverage and invariably had a high Petzval sum.

Therefore, an objective of this invention is to produce an optical lens system which is low in spherical aberration.

Another object of this invention is to produce an optical lens system which is low in coma.

Another object of this invention is to produce an optical lens system which is low in astigmatism.

Another object of this invention is to produce an optical lens system which has a low Petzval sum.

Another object of this invention is to produce an optical lens system which is low in distortion.

Another object of this invention is to produce a optical lens system which has a wide field.

Another object of this invention is to produce an optical lens system which is low in secondary spectrum.

Another object of this invention is to produce an optical lens system which is diffraction limited.

SUMMARY OF THE INVENTION

The invention may be incorporated in an optical lens system, comprising in combination, first, second and third lens means, said first lens means including a diverging compound meniscus component, said second lens means being a single diverging component, said third lens means including a diverging compound meniscus component, and means establishing said first and third lens means with said compound components of sad first and third lens means adjacent to said second lens means.

Other objects and a fuller understanding of the invention may be had by referring to the following description and claims, taken in conjunction with the accompanying drawing.

BRIEF DESCRIPTION OF THE DRAWING

The drawing illustrates an optical lens system, comprising a first lens means 21, a second lens means 22 and a third lens means 23. The first lens means 21 includes first and second components 1 and 2, and a diverging compound component 26. This compound component 26 is shown as a negative meniscus doublet having a positive meniscus third element 3, in contact with a negative meniscus fourth element 4. The third element 3 has an index of refraction N3, an Abbe number $\nu 3$, an axial thickness t3 and surface radii R5 and R6. The fourth element 4 has an index of refraction N4, an Abbe number $\nu 4$, an axial thickness t4 and surface radii R7 and R8.

The second lens means 22 includes a diverging component shown as a fifth element 5. The fifth element 5 is a double concave diverging element having an index of refraction N5, an Abbe number $\nu 5$, an axial thickness t5 and surface radii R9 and R10. The second lens means 22 is shown spaced from the first lens means 21 by an amount S4 and spaced from the third lens means 23 by an mount S5.

The third lens means 23 includes a diverging compound component 27 which is shown as a diverging doublet having a sixth element 6 which is a negative meniscus element in contact with a seventh element 7 being a positive meniscus element. The sixth element 6 has an index of refraction N6, an Abbe number $\nu 6$, an axial thickness t6 and surface radii R11 and R12. The seventh element 7 has an index of refraction N7, an Abbe number $\nu 7$, an axial thickness t7 and surface radii R13 and R14. The diverging compound components 26 and 27 can be substantially identical to one another. Means are provided, such as a lens housing, not shown, establishing the first lens means 21 and the third lens means 23 with the compound components 26 and 27 adjacent to the second lens means 22. This means includes a symmetrical spacing (S4 = S5) of the first lens means 21 and the third lens means 23 with respect to the second lens means 22. The drawing shows the first and third lens means 21, 23 symmetrically spaced about the second lens means 22. In this example the first lens means 21 is the mirror image of the third lens means 23.

The first lens means 21 includes the first and second components 1 and 2. The first component 1 is a converging first element 1 and is shown in the drawing as a double convex element having an index of refraction N1, an Abbe number $\nu 1$, an axial thickness t1 and surface radii R1 and R2. The second component 2 is a converging second element 2 and is shown as a positive meniscus element having an index of refraction N2, an Abbe number $\nu 2$, an axial thickness t2 and surface radii R3 and R4. The second component 2 is spaced from the first component 1 by an amount S1 and is spaced from the third component 26 by a distance S2.

The third lens means 23 includes an eighth element 8 shown as a positive meniscus converging element having an index of refraction N8, an Abbe number $\nu 8$, an axial thickness t8 and surface radii R15 and R16. The third lens means 23 also includes a ninth converging element 9, which is shown as a double convex element having an index of refraction N9, an Abbe number $\nu 9$, an axial thickness t9 and surface radii R17 and R18. The eighth element 8 is spaced from the compound component 27 an amount S7, and the ninth element 9 is spaced from he eighth element 8 by an amount S8. The first and third lens means 21 and 23 can be substantially identical to one another. In such a case, the first components, elements 1 and 9, are substantially identical to one another, the second components, elements 2 and 8, are substantially identical to one another and the third components 26 and 27 including elements 3, 7 and 4, 6, respectively, are substantially identical to one another. The first and third lens means 21 and 23 are arranged in sequence about the second lens means 22.

The first components which include elements 1 and 9, are positive converging double convex components which introduce undercorrected spherical aberrations, and astigmatism, and coma of opposing signs. The indices of refraction of the first components are selected to reduce secondary spectrum; typically the indices of refraction will be less than 1.52. The Abbe numbers of elements 1 and 9 should be greater than 75.0 as typically found in fluorite crown glass.

The second components which include elements 2 and 8 are positive meniscus converging elements which introduce undercorrected spherical aberrations, undercorrected astigmatism, and coma of opposing signs. The indices of refraction of the second components 2 and 8 are selected to reduce secondary spectrum; typically less than 1.52. The Abbe numbers of elements 2 and 8 should also be greater than 75.0.

The third components 26 and 27 each includes a positive meniscus element 3 and 7 and a negative meniscus element 4 and 6, respectively. The positive meniscus elements 3 and 7 produce positive power at radii R5 and R14 at an aplanatic condition. The indices of refraction of elements 3 and 7 are selected to be as high as possible (greater than 1.65) to create the aplanatic condition and to reduce the Petzval sum. The radii R6, R7 and R12, R13 aid in the chromatic correction of the lens. Spherochromatism is reduced by the fact that radii R6 and R13 are convex away from the second lens means 22. The negative power of radii R8 and R11 introduce overcorrected spherical aberration and overcorrected astigmatism. The indices of refraction of elements 4 and 6 in this preferred embodiment are matched with the indices of refraction of elements 3 and 7 to prevent the introduction of higher order aberrations. Typically the indices of refraction of elements 1, 2, 8 and 9 will be less than the indices of refraction of elements 4 and 6 which in turn are less than the indices of refraction of elements 3 and 7. The Abbe numbers of elements 4 and 6 should be greater than 36.0, which is typical of glass found within the light flint region. The thickness of the third components 26 and 27 is typically greater than 0.09F where F is the focal length of the lens.

The second lens means includes a fifth element 5 which is a double concave negative element which produces negative power and introduces overcorrected spherical aberration, and overcorrected astigmatism. Element 5 introduces a strong negative Petzval sum to reduce the Petzval sum of the lens system. The Abbe number of element 5 is typically greater than 36.0. The radii R9 and R10 of element 9 can be equal or unequal depending upon the application of the lens. If a 1:1 magnification is desired, then the radii R9 and R10 will be proportional to one another within a range of 2:1.

Table A contains data used by the inventor to construct a lens in accordance with this invention. A negative radius indicates a concave surface whereas a positive radius indicates a convex surface. Table B contains the same data as Table A with the exception that the radii, thicknesses and spacings are given in terms of the focal length of the lens system.

Tests on a lens system constructed in accordance with Table A indicate that the objectives of this invention have been achieved. The lens has an effective focal length F of 5.51 inches with a relative aperture of $f$ 6.0 and has a field coverage of three inches in diameter at 1:1 magnification. The lens system has a secondary spectrum when it is achromatized from the E and F spectral lines that is less than 0.00005 F. This is approximately 10 times better than prior art lenses of comparable focal length and field coverage. This ten-fold improvement is due primarily to the design of the first, second, eighth and ninth lens elements. The Petzval curvature is less than 0.20 the power of the lens and the radius of the Petzval surface is greater than 5.0F. The Petzval sum of the entire lens system is 0.0277 which is lower than most prior art lenses. This improvement is due primarily to the design of the third through seventh lens elements. The lens system has a very high resolution of 300 lines per millimeter at 1:1 magnification indicating that the lens is diffraction limited.

TABLE A

| | | |
|---|---|---|
| R1 = +6.7073 in. | N1= 1.48656 | $\nu$1 = 84.47 |
| R2 = +14.013 in. | N2= 1.48656 | $\nu$2 = 84.47 |
| R3 = +3.5772 in. | N3= 1.69100 | $\nu$3 = 54.71 |
| R4 = −22.00 in. | N4= 1.58144 | $\nu$4 = 40.85 |
| R5 = +2.1359 in. | N5= 1.58144 | $\nu$5 = 40.85 |
| R6 = −3.4268 in. | N6= 1.58144 | $\nu$6 = 40.85 |
| R7 = +3.4268 in. | N7= 1.69100 | $\nu$7 = 54.71 |
| R8 = −1.6470 in. | N8= 1.48656 | $\nu$8 = 84.47 |
| R9 = −3.4086 in. | N9= 1.48656 | $\nu$9 = 84.47 |
| R10 = −4.9391 in. | | |
| R11 = −1.6470 in. | S1= 0.0165 in. | $t$1 = 0.165 in. |
| R12 = +3.4268 in. | S2= 0.0165 in. | $t$2 = 0.165 in. |
| R13 = −3.4268 in. | S4= 0.3960 in. | $t$3 = 0.440 in. |
| R14 = +2.1359 in. | S5= 0.3960 in. | $t$4 = 0.165 in. |
| R15 = −22.00 in. | S7= 0.0165 in. | $t$5 = 0.175 in. |
| R16 = +3.5772 in. | S8= 0.0165 in. | $t$6 = 0.165 in. |
| R17 = +14.013 in. | | $t$7 = 0.440 in. |
| R18 = +6.7073 in. | | $t$8 = 0.165 in. |
| | | $t$9 = 0.165 in. |

Focal Length = F = 5.51
Relative aperture f/6.0 (at 1:1 magnification)
1:1 Magnification Field
of View 3.0 inches in diameter.

TABLE B

| | | |
|---|---|---|
| R1 = +1.2173 F | N1= 1.48656 | $\nu$1= 84.47 |
| R2 = +2.5432 F | N2= 1.48656 | $\nu$2= 84.47 |
| R3 = +0.6492 F | N3= 1.69100 | $\nu$3= 54.71 |
| R4 = −3.9927 F | N4= 1.58144 | $\nu$4= 40.85 |
| R5 = +0.3876 F | N5= 1.58144 | $\nu$5= 40.85 |
| R6 = −0.6219 F | N6= 1.58144 | $\nu$6= 40.85 |
| R7 = +0.6219 F | N7= 1.69100 | $\nu$7= 54.71 |
| R8 = −0.2989 F | N8 = 1.48656 | $\nu$8= 84.47 |
| R9 = −0.6186 F | N9= 1.48656 | $\nu$9= 84.47 |
| R10 = −0.8964 F | | |
| R11 = − 0.2989 F | S1= 0.00299 F | $t$1= 0.02994 F |
| R12 = +0.6219 F | S2= 0.00299 F | $t$2= 0.02994 F |
| R13 = −0.6219 F | S4= 0.07186 F | $t$3= 0.07985 F |
| R14 = +0.3876 F | S5= 0.07186 F | $t$4= 0.02994 F |
| R15 = −3.9927 F | S7= 0.00299 F | $t$5= 0.03176 F |
| R16 = +0.6492 F | S8= 0.00299 F | $t$6= 0.02994 F |
| R17 = +2.5432 F | | $t$7= 0.07985 F |
| R18 = +1.2173 F | | $t$8= 0.02994 F |
| | | $t$9= 0.02994 F |

Relative Aperature f/6.0 (at 1:1 magnification)
1:1 Magnification Field of
View 0.545 F in diameter.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:
1. An optical lens system, comprising in combination, a converging element,
first, second and third lens means;
said first lens means including a diverging compound meniscus component, said second lens means being a double concave component having radii within a proportional range of two to one, said third lens means including a diverging compound meniscus component, said first and third lens means being substantially identical, and means establishing said first and third lens means with said compound components of said first and third lens means substantially symmetrically disposed about said second lens means.

2. An optical lens system, comprising in combination, first, second and third lens means;

said first lens means having first through third components, said first component being a double convex element, said second component being a positive meniscus element, said third component being a negative meniscus compound component, said second lens means being a double concave element having radii within a proportional range of two to one, said third lens means being substantially identical to said first lens means, and means establishing said first and third lens means with said compound components of said first and third lens means symmetrically spaced from said second lens means.

3. An optical lens system as set forth in claim 2, wherein said third component includes a positive meniscus element in contact with a negative meniscus element.

4. An optical lens system, comprising in combination, first, second and third lens means;

said first lens means having first through fourth elements arranged in sequence, said first element being double convex having radii of R1 and R2, said second element being a positive meniscus having radii of R3 and R4 and being spaced from said first element by an amount S1, said third element being a positive meniscus element having radii of R5 and R6 and being spaced from said second element by an amount S2, said fourth element being a negative meniscus having radii of R7 and R8 and in contact with said third element, said second lens means having a double concave element with radii of R9 and R10, an axial thickness t5, an index of refraction N5 and an Abbe number $\nu 5$, said third lens means being substantially identical to said first lens means, means establishing said first and third lens means substantially symmetrically spaced about said second lens means at a spacing of S4 with said fourth elements of said first and third lens means adjacent to said second lens means, said first through fourth elements having axial thicknesses $t_1 - t_4$, indices of refraction $N_1-N_4$ and Abbe numbers $\nu 1- \nu 4$, respectively, and the optical lens system having an effective focal length of F and said indices of refraction are substantially:

$$N1, N2 < N3.$$

5. An optical lens system as set forth in claim 4 wherein said indices of refraction are substantially:

$$N1, N2 \leq 1.52$$
$$N3 \geq 1.65.$$

6. An optical lens system as set forth in claim 4, wherein said indices of refraction are substantially:

$$N1, N2 < N4, N5 < N3.$$

7. An optical lens system as set forth in claim 4, wherein said radii magnitudes are substantially:

$$R8 < R5 < R3 < R1 < R2.$$

8. An optical lens system as set forth in claim 4, wherein said radii magnitudes are substantially:
$$R8 < R5 < R6, R7 < R3 < R1 < R2 < R4.$$

9. An optical lens system as set forth in claim 4, wherein said Abbe numbers are substantially:

$$\nu 1, \nu 2 > 75.0$$
$$\nu 4, \nu 5 > 36.0.$$

10. An optical lens system as set forth in claim 4, wherein said Abbe numbers are substantially:

$$\nu 4, \nu 5 < \nu 3 < \nu 1, \nu 2.$$

11. An optical lens system as set forth in claim 4, wherein said thicknesses are substantially:

$$t3 + t4 > 0.09F$$

12. An optical lens system as set forth in claim 4, wherein said thicknesses are substantially:

$$t3 > 0.06 \, F.$$

13. An optical lens system as set forth in claim 4, wherein said thicknesses are substantially:

$$t1, t2, t4 < t5 < t3.$$

14. An optical lens system as set forth in claim 4, wherein said spacing S4 is substantially:

$$0.06 \, F < S4 < 0.10 \, F.$$

15. An optical lens system as set forth in claim 4, wherein said spacings are substantially:

$$S1, S2 < S4.$$

16. An optical lens system as set forth in claim 4, wherein said radii magnitude, said indices of refraction, said spacings, said thicknesses and said Abbe numbers are substantially:

$R8 < R5 < R9 < R6, R7 < R3 < R10 < R1 < R2 < R4$
$N1, N2 < N4, N5 < N3; N1, N2 \leq 1.52; N3 \geq 1.65$
$\nu 4, \nu 5 < 3 < \nu 1, \nu 2; \nu 1, \nu 2 > 75.0; \nu 4, \nu 5 > 36.0$
$t1, t2, t4 < t5 < t3; t3 > 0.06 \, F; t3 + t4 > 0.09 \, F$
$S1, S2 < S4; 0.06 \, F < S4 < 0.10 \, F.$ 17. An optical lens system as set forth in claim 4, wherein said R9 and R10 radii are proportional to one another within a range of two to one.

18. An optical lens system, comprising in combination, first, second and third lens means;

said first lens means having first through fourth elements arranged in sequence, said first element being double convex having radii of R1 and R2, said second element being a positive meniscus having radii of R3 and R4 and being spaced from said first element by an amount S1, said third element being a positive meniscus element having radii of R5 and R6 and being spaced from said second element by an amount S2, said fourth element being a negative meniscus having radii of R7 and R8 and in contact with said third element, said second lens means having a double concave element with radii of R9 and R10, an axial thickness t5, an index of refraction N5 and an Abbe number ν5, said third lens means being substantially identical to said first lens means, means establishing said first and third lens means substantially symmetrically spaced about said second lens means at a spacing S4 with said fourth elements of said first and third lens means adjacent to said second lens means, said first through fourth elements having axial thicknesses t1 – t4, indices of refraction N1-N4 and Abbe numbers ν1 – ν4 respectively, the optical lens system having an effective focal length of F and said radii magnitudes, said indices of refraction, said spacings, said thicknesses, and said Abbe numbers being substantially:

R1 = +1.22 F
R2 = +2.54 F
R3 = +0.65 F
R4 = −3.99 F
R5 = +0.39 F
R6 = −0.62 F
R7 = +0.62 F
R8 = −0.30 F
R9 = −0.62 F
R10 = −0.90 F

S1 = S2 = 0.0030 F
S4 = 0.072 F t1 = t2 = t4 = 0.030 F
t3 = 0.080 F
t5 = 0.032 F

N1 = N2 = 1.49
N3 = 1.69
N4 = N5 = 1.58

ν1 = ν2 = 84.5
ν3 = 54.7
ν4 = ν5 = 40.8 wherein a positive radius indicates a convex surface and a negative radius indicates a concave surface.

19. An optical lens system, comprising in combination, first, second and third lens means;

said first lens means having first through fourth elements arranged in sequence, said first element being double convex having radii of R1 and R2, said second element being a positive meniscus having radii of R3 and R4 and being spaced from said first element by an amount S1, said third element being a positive meniscus element having radii of R5 and R6 and being spaced from said second element by an amount S2, said fourth element being a negative meniscus having radii of R7 and R8 and in contact with said third element, said second lens means having a double concave element with radii of R9 and R10, an axial thickness t5, an index of refraction N5 and an Abbe number ν5, said third lens means being substantially identical to said first lens means, means establishing said first and third lens means substantially symmetrically spaced about said second lens means at a spacing of S4 with said fourth elements of said first and third lens means adjacent to said second lens means, said first through fourth elements having axial thicknesses t1-t4, indices of refraction N1-N4 and Abbe numbers ν1 – ν4, respectively, the optical lens system having an effective focal length of F and and said radii, said thicknesses, said indexes of refraction and said Abbe numbers being substantially:

R1 = +1.2173 F
R2 = +2.5432 F
R3 = +0.6492 F
R4 = −3.9927 F
R5 = +0.3876 F
R6 = −0.6219 F
R7 = +0.6219 F
R8 = −0.2989 F
R9 = −0.6186 F
R10 = −0.8964 F t1 = t2 = t4 = 0.02994 F
t3 = 0.07985 F
t5 = 0.03176 F

N1 = N2 = 1.48656
N3 = 1.69100
N4 = N5 = 1.58144

ν1 = ν2 = 84.47
ν3 = 54.71
ν4 = ν5 = 40.85
S1 = S2 = 0.00299 F
S4 = 0.07186 F wherein a positive radius indicates a convex surface and a negative radius indicates a concave surface.

* * * * *